United States Patent
Gindele et al.

(10) Patent No.: US 7,054,501 B1
(45) Date of Patent: May 30, 2006

(54) ESTIMATING NOISE FOR A DIGITAL IMAGE UTILIZING UPDATED STATISTICS

(75) Inventors: Edward B. Gindele, Rochester, NY (US); Navid Serrano, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 547 days.

(21) Appl. No.: 09/712,365

(22) Filed: Nov. 14, 2000

(51) Int. Cl.
*G06K 9/40* (2006.01)

(52) U.S. Cl. ...................................... 382/266; 382/260

(58) Field of Classification Search ........ 382/260–266, 382/272, 276, 172, 168
See application file for complete search history.

(56) References Cited

U.S. PATENT DOCUMENTS

| 5,729,631 A | * | 3/1998 | Wober et al. ............... 382/232 |
| 5,809,178 A | | 9/1998 | Anderson et al. ........... 382/251 |
| 5,923,775 A | | 7/1999 | Snyder et al. .............. 382/172 |
| 6,069,982 A | | 5/2000 | Reuman ..................... 382/275 |
| 6,118,906 A | | 9/2000 | Keyes et al. ................ 382/266 |
| 6,128,415 A | * | 10/2000 | Hultgren et al. ............ 382/276 |

OTHER PUBLICATIONS

Jong-Sen Lee, Digital Image Smoothing and the Sigma Filter, Computer Vision, Graphics and Image Processing, vol. 24, 1983, pp. 255-269.

\* cited by examiner

*Primary Examiner*—Duy M. Dang
(74) *Attorney, Agent, or Firm*—Raymond L. Owens

(57) ABSTRACT

A method of estimating noise in a digital image receiving a digital image; providing a first statistical table related to noise provided by an image source; and using the pixels of the digital image to calculate a second statistical table related to the noise provided by the image source in capturing the image. The method further includes using the first statistical table and the second statistical table to provide an updated third statistical table related to the noise provided by the image source in capturing the image; and calculating a noise characteristic table from the third statistical table for use in enhancing the digital image.

10 Claims, 4 Drawing Sheets

ESTIMATING NOISE FOR A DIGITAL IMAGE UTILIZING UPDATED STATISTICS

FIELD OF INVENTION

The present invention relates to producing noise estimates from digital images which can be used for enhancing such digital images.

BACKGROUND OF THE INVENTION

Some digital image processing applications designed to enhance the appearance of the processed digital images take explicit advantage of the noise characteristics associated with the source digital images. For example, Keyes et al. in U.S. Pat. No. 6,118,906 describe a method of sharpening digital images which includes the steps of measuring the noise components in the digital image with a noise estimation system to generate noise estimates; and sharpening the digital image with an image sharpening system which uses the noise estimates. Similarly, digital imaging applications have incorporated automatic noise estimation methods for the purpose of reducing the noise in the processed digital images as in the method described by Anderson et al. in U.S. Pat. No. 5,809,178.

In commonly-assigned U.S. Pat. No. 5,923,775, Snyder et al. disclose a method of image processing which includes a step of estimating the noise characteristics of a digital image and using the estimates of the noise characteristics in conjunction with a noise removal system to reduce the amount of noise in the digital image. The method described by Snyder et al. is designed to work well for individual digital images and includes a multiple step process for the noise characteristics estimation procedure. First the residual signal is formed from the digital image obtained by applying a spatial filter to the digital image. This first residual is analyzed to form a mask signal which determines what regions of the digital image more and less likely to contain image structure content. The last step includes forming a second residual signal and sampling the residual in image regions unlikely to contain image structure content to form the noise characteristic estimation.

In U.S. Pat. No. 6,069,982, Reuman et al. describe a method of automatically estimating the noise characteristics of a digital image acquisition device which includes providing predetermined default values for the spatial noise characteristics of the digital image acquisition device, gathering information related to the spatial noise characteristics of the digital image acquisition device; generating replacement data in response to said gathered information; and updating said predetermined default spatial noise characteristics associated with the digital image acquisition device with said replacement data. In particular the method disclosed by Reuman et al. estimate the standard deviation (derived from the variance) as a function of the grey-level (pixel value) and the spatial frequency characteristics of the noise. The noise characteristics, such as a table of standard deviation values as a function of grey-level, are provided as the default values. Each digital image to be processed is analyzed which includes the calculation of statistical quantities in the gathering of information step. These statistical quantities and the default values are combined to calculate the updated replacement noise characteristic values.

The method described by Reuman et al. further teaches a method of selecting between a predetermined table of statistics and a using a captured digital image of interest to estimating noise characteristics. If there is no predetermined table of statistics, only then Reuman et al. use the captured digital image to estimate noise characteristics.

SUMMARY OF THE INVENTION

It is an object of the present invention to provide an improved method of estimating noise in a digital image captured by a particular image source or medium.

It is a further object of the present invention to make use of noise in a captured digital image to provide statistics which are representative of the image source.

These objects are achieved in a method of estimating noise in a digital image, comprising the steps of:

a) receiving a digital image;

b) providing a first statistical table related to noise provided by an image source;

c) using the pixels of the digital image to calculate a second statistical table related to the noise provided by the image source in capturing the image;

d) using the first statistical table and the second statistical table to provide an updated third statistical table related to the noise provided by the image source in capturing the image; and e) calculating a noise characteristic table from the third statistical table for use in enhancing the digital image.

It is an advantage of the present invention that the third statistical table can be updated based on noise provided by the latest digital image to be processed. It is a feature of the invention that it is adaptive and can adjust for variations that occur over time in a particular image capture source. It is a further advantage that the noise estimate provided to produce an image noise characteristic table can become a more accurate representation of the noise with each update.

DETAILED DESCRIPTION OF THE INVENTION

In the following description, a preferred embodiment of the present invention will be described as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

Figure 1:
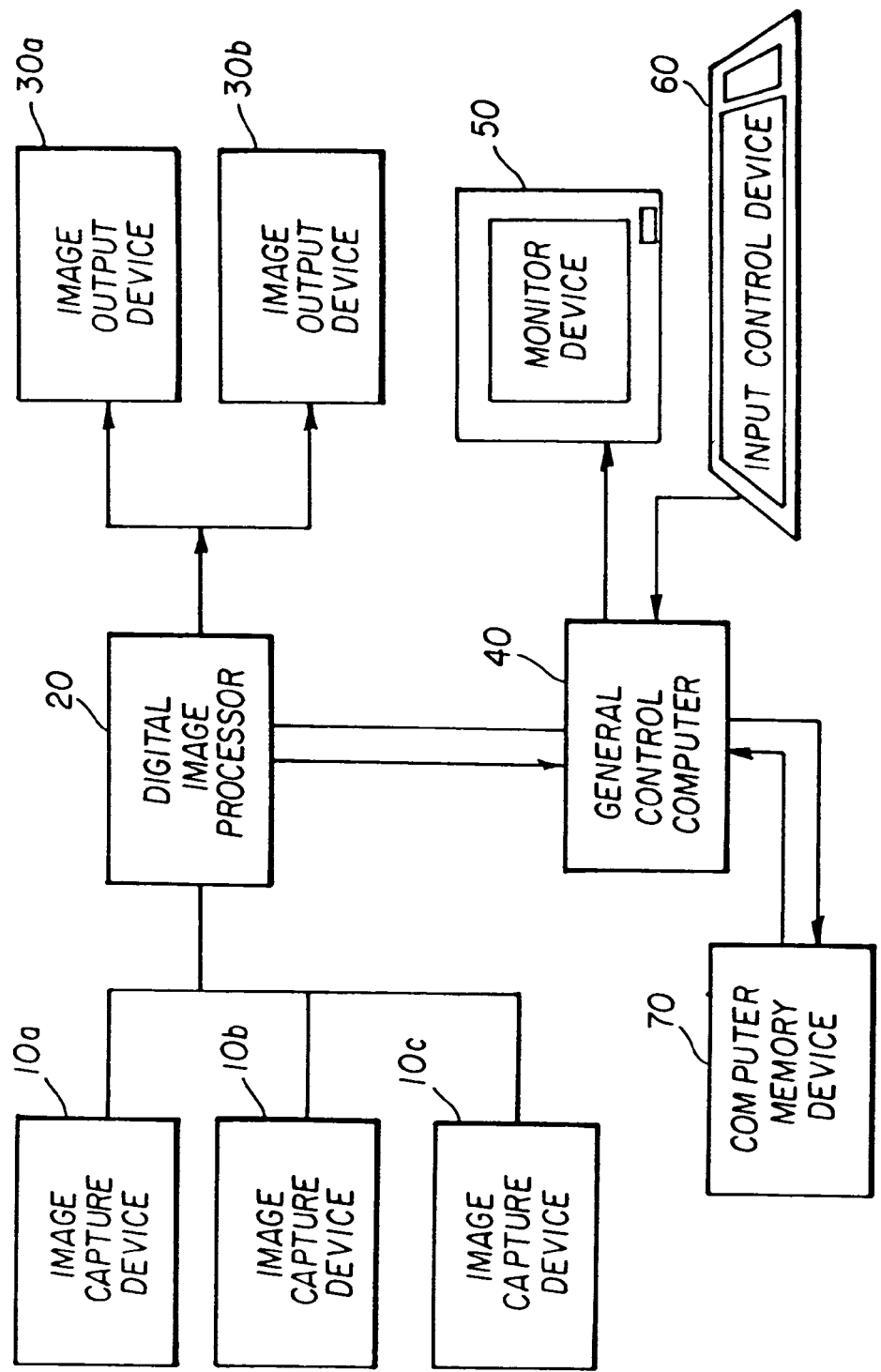
FIG. 1 is a functional block diagram showing the component parts of an apparatus which can implement the present invention.

The present invention may be implemented in computer hardware. Referring to FIG. 1, the following description relates to a digital imaging system which includes an image capture device 10a, an digital image processor 20, an image output device 30a, and a general control computer 40. The system may include a monitor device 50 such as a computer console or paper printer. The system may also include an input device control for an operator such as a keyboard and or mouse pointer 60. Multiple capture devices 10a, 10b, and 10c are shown illustrating that the present invention may be used for digital images derived from a variety of imaging devices. For example, FIG. 1 may represent a digital photofinishing system where the image capture device 10a is a conventional photographic film camera for capturing a scene on color negative or reversal film, and a film scanner device for scanning the developed image on the film and producing a digital image. The digital image processor 20 provides the means for processing the digital images to produce pleasing looking images on the intended output device or media. Multiple image output devices 30a and 30b are shown illustrating that the present invention may be used in conjunction with a variety of output devices which may include a digital photographic printer and soft copy display. The digital image processor processes the digital image to adjust the overall brightness, tone scale, image structure etc. of the digital image in a manner such that a pleasing looking image is produced by an image output device 30a. Those skilled in the art will recognize that the present invention is not limited to just these mentioned image processing modules.

The general control computer 40 shown in FIG. 1 may store the present invention as a computer program stored in a computer readable storage medium, which may comprise, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by offline memory device 70. Before describing the present invention, it facilitates understanding to note that the present invention is preferably utilized on any well-known computer system, such as a personal computer.

It should also be noted that the present invention implemented in a combination of software and/or hardware is not limited to devices which are physically connected and/or located within the same physical location. One or more of the devices illustrated in FIG. 1 may be located remotely and may be connected via a wireless connection.

A digital image is comprised of one or more digital image channels. Each digital image channel is comprised of a two-dimensional array of pixels. Each pixel value relates to the amount of light received by the image capture device 10 corresponding to the geometrical domain of the pixel. For color imaging applications a digital image will typically consist of red, green, and blue digital image channels. Other configurations are also practiced, e.g. cyan, magenta, and yellow digital image channels. For monochrome applications, the digital image consists of one digital image channel. Motion imaging applications can be thought of as a time sequence of digital images. Those skilled in the art will recognize that the present invention can be applied to, but is not limited to, a digital image channel for any of the above mentioned applications. In fact, the present invention can be applied to any two dimensional array of noise corrupted data to obtain an estimated noise table. Although the present invention describes a digital image channel as a two dimensional array of pixel values arranged by rows and columns, those skilled in the art will recognize that the present invention can be applied to mosaic (non rectilinear) arrays with equal effect.

Figure 2:
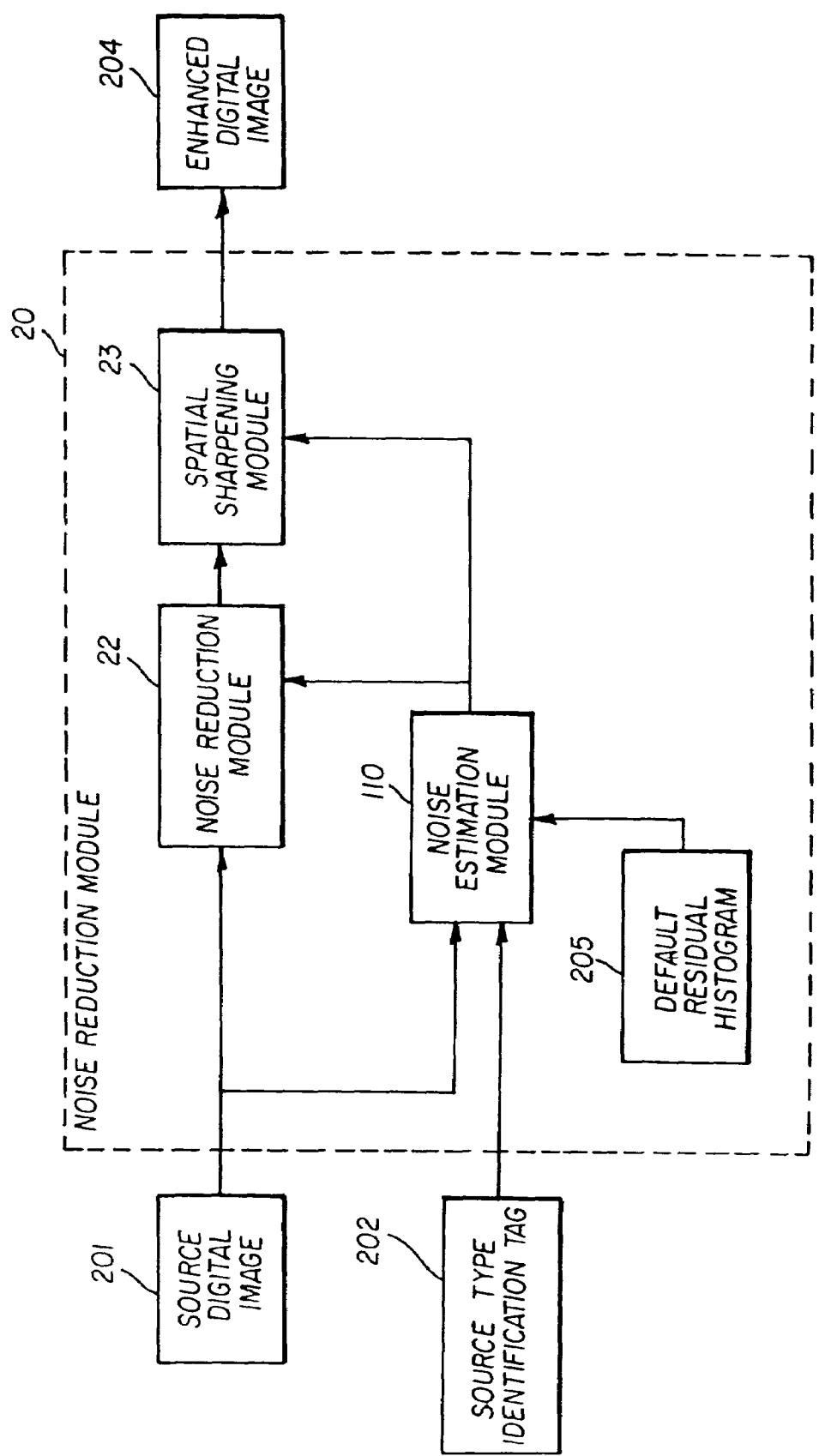
FIG. 2 is a functional block diagram of a method of the image processor module employed by the preferred embodiment of the present invention.

The digital image processor 20 shown in FIG. 1 is illustrated in more detail in FIG. 2. The general form of the digital image processor 20 employed by the present invention is a cascaded chain of image processing modules. The source digital image 201 is received by the digital image processor 20 which produces on output an enhanced digital image 204 and an estimated noise characteristic table 207. The noise estimation module 110 receives the source digital image 201 and the default residual histogram 205 and produces an estimated noise characteristic table 207 and an updated residual histogram. The updated residual histogram replaces the default residual histogram 205 for the next source digital image 201 to be processed. Each image processing module contained within the digital image processor 20 receives a digital image, modifies the digital image, produces a processed digital image and passes the processed digital image to the next image processing module. The two enhancement transform modules shown within the digital image processor 20 are a noise reduction module 22 and a spatial sharpening module 23. These two modules use the estimated noise characteristic table 207 produced by the noise estimation module 110 to produce the enhanced digital image 204. Those skilled in the art will recognize that any other image processing module that utilizes an estimated noise characteristic table 207 can be used with the present invention.

Figure 3:
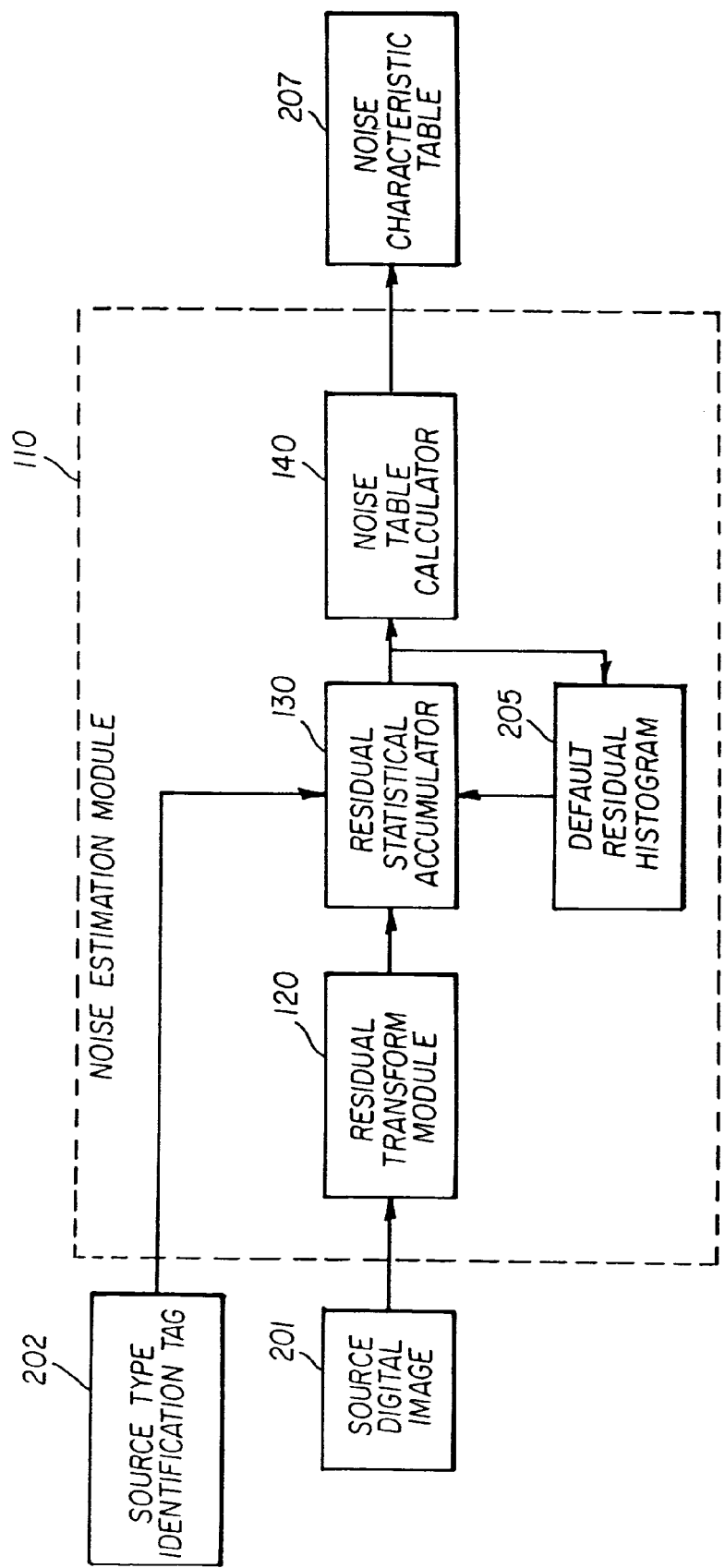
FIG. 3 is a function block diagram of the noise estimation module used by the preferred embodiment of the present invention.

The noise estimation module shown in FIG. 2 is illustrated in more detail in FIG. 3. The residual transform module 120 receives the source digital image 201 and applies a spatial filter to the source digital image 201 which results in a residual digital image. The residual statistics accumulator 130 receives the residual digital image and calculates a set of local residual histograms from the pixel data of the residual digital image. The residual statistics accumulator 130 also receives a set of default residual histograms 205 and combines the set of local residual histograms and the set of default residual histograms 205 to produce a set of updated residual histograms. The noise table calculator 140 receives the updated residual histograms and produces a noise characteristic table 207.

The residual transform module 120 performs a spatial filtering operation on the pixel data of the source digital image 201. That is, a residual pixel value is generated for each original pixel value in the source digital image 201. The residual pixel values constitute the residual digital image. For each pixel of interest, a combination of pixel values sampled from a local region of pixels is used to form the residual pixel value. If the source digital image 201 is a color digital image, the residual transform module 120 performs the spatial filtering operation on each color digital image channel and forms a residual pixel value for each pixel of each color digital image channel. The preferred embodiment of the present invention uses a two-dimensional Laplacian operator as the spatial filter to form the residual pixel values. The Laplacian operator calculates a local arithmetic mean value from the value of pixel sampled from the local region of pixels about the pixel of interest and subtracts the value of the pixel of interest from the local arithmetic mean value. A local region of 3 by 3 pixels is used. The Laplacian operator is convolution spatial filter with an associated convolution kernel of:

$$\begin{matrix} 1 & 1 & 1 \\ 1 & -1 & 1 \\ 1 & 1 & 1 \end{matrix} \quad (1)$$

Although the preferred embodiment of the present invention uses a two dimensional Laplacian based spatial filter, those skilled in the art will recognize that the present invention can be practiced with other spatial filters, such as but not limited to, one-dimensional Laplacian spatial filters.

An alternative embodiment of the present invention uses the method disclosed by Snyder et al. in commonly-assigned U.S. Pat. No. 5,923,775. In this alternative embodiment, a similar technique of forming a residual pixel value is performed. Next, a gradient signal is calculated using a spatial filter. The gradient signal is analyzed to form a masking signal that is used to reject some of the residual pixel values from later consideration. Although this alternative embodiment leads to more accurate noise estimation it is also more computationally intensive than the preferred embodiment.

The residual statistics accumulator 130 shown in FIG. 3 is described in more detail. The pixel data of the source digital image 201 can be conceptualized as having two components—a signal component relating to photographed objects and a noise component. The resulting residual pixel values have statistical properties that have a closer relationship to the noise component of the pixel data of the source digital image 201 than the signal component. Although the noise component can contain sub-components, the stochastic sub-component of the noise component is well modeled by a zero mean Gaussian probability distribution function. To first order, the noise component of the pixel data of the source digital image 201 can be characterized by a standard deviation and a mean value of zero. To second order, standard deviation of the noise component can be modeled as being signal and color channel dependent.

The residual transform module 130 analyzes the residual pixel values and records these values in the form of a set of local residual histograms as a function of the color digital image channel and pixel value. Therefore a given local residual histogram $H_{ik}$ relates to the $i^{th}$ color digital image channel and the $k^{th}$ pixel value sub-range. For each pixel of interest denoted by $p_{mn}$ (corresponding to the $m^{th}$ row and $n^{th}$ column location) in the processed color digital image channel, a histogram bin index k is computed. For example, if the numerical range of pixel values is from 0 to 255 there can be as many as 256 useful histograms, i.e. one histogram for each possible numerical pixel value. In general, most noise sources can be characterized as having noise standard deviations that are slow functions of the pixel value. Therefore, the preferred embodiment of the present invention uses 8 histograms to cover the numerical pixel value range of 0 to 255. Thus the calculated histogram index bin and the corresponding sub-range pixel values are given by the following table (1).

TABLE (1)

| histogram bin index | sub-range pixel values | average pixel value |
|---|---|---|
| 0 | 0 to 31 | 16 |
| 1 | 32 to 63 | 48 |
| 2 | 64 to 95 | 80 |
| 3 | 96 to 127 | 112 |
| 4 | 128 to 159 | 144 |
| 5 | 160 to 191 | 176 |
| 6 | 192 to 233 | 208 |
| 7 | 234 to 255 | 240 |

Those skilled in the art will recognize that the present invention can be practiced with digital image pixel data with any numerical range. The number of local residual histograms used for each color digital image channel will depend on the accuracy of results required for the particular digital imaging application.

Although each local residual histogram records statistical information for a range of pixel values for a given color digital image channel, the local residual histogram records the frequency of residual pixel values associated with each pixel of interest $p_{mn}$. Since the expected mean of the distribution of residual pixel values is zero, the residual pixel values exhibit both positive and negative values. Therefore, the local residual histogram must record the frequency, i.e. the number of instances of residual pixel values, of all possible instances of residual pixel values. For the example above, the residual pixel values can range from −255 to +255. While is possible to construct local residual histograms with as many recording bins as there are possible instances of residual pixel values, in general this is not necessary. For most digital images only a small percentage of residual pixel values exhibit values near the extremes of the possible range. The present invention uses 101 total recording bins for each local residual histogram. On of the recording bins corresponds to residual pixel values of 50 and greater. Similarly, one other recording bin corresponds to residual pixel values of −50 and lower. The other 99 recording bins each correspond to a single residual pixel value for the numerical range from −49 to +49.

The residual statistics accumulator 130 combines the data contained in the local residual histograms with data contained in the default residual histograms 205. While the local residual histograms record residual pixel values as derived from the currently processed source digital image 201, the default residual histograms 205 record the residual pixel values as derived from the previously processed digital images. Thus the default residual histograms 205 have the same form as the local residual histogram, i.e. one local residual histogram for each pixel value sub-range of each color digital image channel.

The present invention uses more than one method of combining the local residual histograms with the default residual histograms 205, however, each method combines a single local residual histogram with the corresponding default residual histogram 205. Therefore, it is appropriate to discuss the method with respect to the combination of two histograms with the assumption that each combining method is repeated for all the pairs of corresponding histograms.

The preferred embodiment of the present invention uses a direct method of combining the data contained in the local residual histogram and default residual histogram 205. That is, the numbers contained in each recording cell of the local residual histogram are added directly to the corresponding recording cell of the default residual histogram 205. Thus after the combining step has been performed, the updated values of each recording cell is given by the sum of the previous value of the recording cell with the value contained in the corresponding recording cell of the local residual histogram.

Since the recording cells of the default residual histogram 205 contains the sum total of residual pixel values derived from the source digital image 201 as well as previous processed digital images, the numerical range of the computer implementation can be exceeded. To avoid a numerical overflow condition the default residual histogram 205 can be re-normalized. The process of re-normalization includes scanning the values of the recording cells to determine the maximum value, comparing this maximum value to a predetermined allowable value. If the maximum value is greater than the a predetermined allowable value the values of all the recording cells are divided by a constant numerical factor. This process of re-normalization of the default residual histogram 205 can be performed either before or after the process of combining the local residual histogram with the default residual histogram 205. The preferred embodiment of the present invention performs the re-normalization process before the combining process.

An alternative embodiment of the present invention produces the updated residual histogram by calculating a weighted average between the default residual histogram 205 and the local residual histogram. For each recording cell of the default residual histogram 205 $RC_d$ and its corresponding recording cell of the local residual histogram $RC_1$, the updated recording cell value $RC_v$ is calculated using the formula:

$$RC_v = \beta RC_d + (1-\beta) RC_1 \qquad (2)$$

where the variable $\beta$ is a numerical weighting factor. The present invention uses $\beta$ value of 0.99 for a which heavily weights the contribution of the default residual histogram 205.

Referring to FIG. 3, the noise table calculator 140 receives the updated residual histograms and calculates a noise characteristic table 207. For each of the updated residual histograms relating to a particular color digital image channel and pixel value range, the noise table calculator 140 derives a noise standard deviation value from the value of the recording cells of the updated residual histogram. The preferred embodiment of the present invention uses equation (3) to calculate the standard deviation value $\sigma_n$ $$\sigma_n ((1/N)\Sigma_k RC_v(k)(x-x_m)^2)^{1/2} \qquad (3)$$

where the variable x represents the average pixel value of the residual pixel values accumulated in the $k^{th}$ recording cell as given by Table (1) and RCv(k) represents the number of residual pixel values accumulated by the $k^{th}$ recording cell.

$$x = V(k) \qquad (4)$$

The variable $x_m$ represents the arithmetic mean value of the corresponding residual pixel values given by equation (5) and, $$x_m = (1/N)\Sigma_k x \qquad (5)$$

and the variable N represents the total number of residual pixel values recorded by the updated residual histogram given by equation (6).

$$N = \Sigma_k RC_v(k) \qquad (6)$$

An alternative embodiment of the present invention performs an alpha-trimmed standard deviation calculation. In this embodiment a first approximation to the standard deviation $\sigma_e$ is calculated using the method described above. The calculation of $\sigma_e$ is then calculated using the only recording cells with corresponding residual pixel values that are within a limited range of zero. The formula for the standard deviation calculation $\sigma_n$ is given by equation (7)

$$\sigma_n ((1/N)\Sigma_k \gamma RC_v(k)(x-x_m)^2)^{1/2} \qquad (7)$$

where the variable $\gamma$ is given by equation (8)

$\gamma = 1$ if $|x| < \alpha^* \sigma_e$ $\gamma = 0$ if $|x| >= \alpha^* \sigma_e$ \qquad (8)

where the variable $\alpha$ is set to 3.0. This alternative embodiment of the present invention is more computationally intensive than the preferred embodiment but does yield more accurate results via the rejection of out-lying residual pixel values from adversely contributing to the calculation of the standard deviation $\sigma_n$ value.

Table 2 below is an example of a noise characteristic table produced with the present invention.

TABLE (2)

| average pixel value | Standard deviation of red channel | Standard deviation of green channel | Standard deviation of blue channel |
|---|---|---|---|
| 16 | 3.28 | 3.62 | 3.21 |
| 48 | 3.71 | 3.20 | 3.38 |
| 80 | 3.77 | 4.14 | 4.50 |
| 112 | 4.57 | 4.35 | 4.21 |
| 144 | 4.98 | 4.25 | 4.37 |
| 176 | 5.05 | 4.11 | 6.21 |
| 208 | 5.05 | 5.64 | 6.29 |
| 240 | 2.71 | 4.27 | 3.87 |

The present invention uses a set of residual histograms to record the calculated statistics. A set of histograms is an example of a statistical table from which a noise characteristic table can be derived. Thus the set of local residual histograms constitutes a local statistical table, the set of default residual histograms 205 constitutes a default statistical table and the set of updated residual histograms constitutes an updated statistical table. Those skilled in the art should recognize that the present invention can be practiced with other forms of statistical tables. For example, the residual digital images could be stored and serve as a statistical table.

Figure 4:
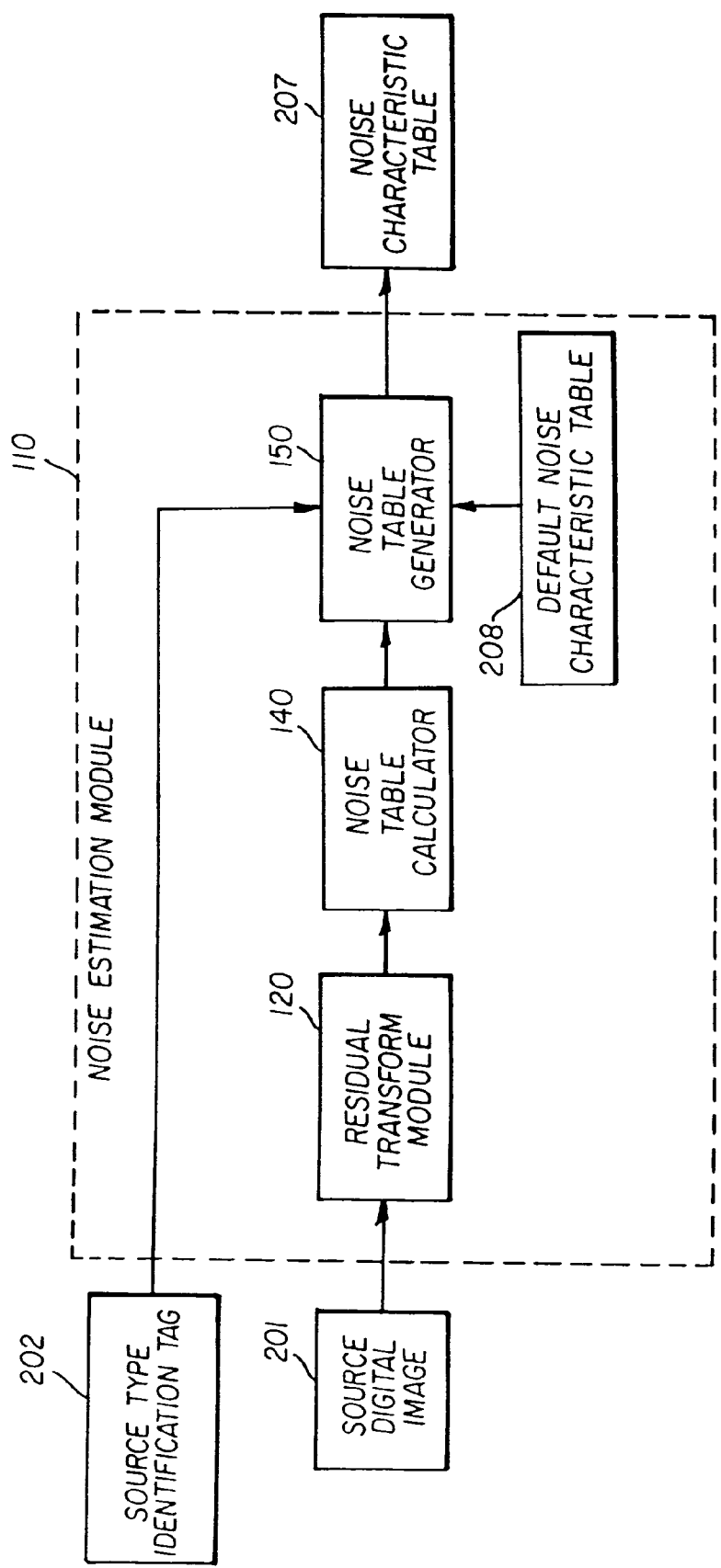
FIG. 4 is a function block diagram of the noise estimation module used by an alternative embodiment of the present invention.

It should be noted that the present invention uses a set of residual histograms as the form for the statistical table due to its inherent computational and storage simplicity. However, the present invention can be practiced by recording a default noise characteristic table 208 instead of recording the residual histograms. FIG. 4 shows the details of an alternative embodiment of the noise estimation module 110. The residual transform module 120 receives the source digital image 201 and calculates a residual digital image. The residual statistics accumulator 130 receives the residual digital image and calculates a set of local residual histograms from the pixel data of the residual digital image as described above. The noise table calculator 140 receives the local residual histograms and produces a local noise characteristic table. The noise table generator 150 receives the local noise characteristic table and the default noise characteristic table 208 and produces an updated noise characteristic table 207. This updated noise characteristic table 207 replaces the default noise characteristic table 208 for the next source digital image 201 to be processed. The local noise characteristic table and default noise characteristic table 208 are combined by calculating a linear combination of these two tables element for element. Good values for the linear combination coefficients are 0.99 contribution for the default noise characteristic table 208 values and 0.01 for the local noise characteristic table values. Although this alternative embodiment of the present invention can be used to generate robust noise characteristic tables, the preferred embodiment generally produces more accurate results.

The calculated noise characteristic table 207 is used in conjunction with spatial filters to produce an enhanced digital image 204 from the source digital image 201. A spatial filter is any method which uses pixel values sampled from a local region about a pixel of interest to calculate an enhanced pixel value which replaces the pixel of interest. Those spatial filters which reduce spatial modulation, for at least some pixels in an effort to remove noise from the processed digital image, can be considered noise reduction filters. Those spatial filters which increase spatial modulation, for at least some pixels in an effort to enhance spatial detail noise in the processed digital image, can be considered spatial sharpening filters. It should be noted that it is possible for a single spatial filter to be considered both a noise reduction filter as well as a spatial sharpening filter. The present invention can be used with any digital image processing method which makes uses of a noise characteristic table to produce an enhanced digital image 204.

Referring to FIG. 3, the preferred embodiment of the present invention employs a noise reduction module 22 as part of the image processing method to produce an enhanced digital image 204. As such, the source digital image 201 and the noise characteristic table 207 are received by the noise reduction module 22 which produces on output a noise reduced digital image.

It is important to note that for many practical digital imaging image systems, other image processing processors need to be included. As long as these other image processing processors accept a digital image as input and produce a digital image on output, one more of these type of image processing processors can be inserted in the image processing chain in between a noise reduction module 22 and a spatial sharpening module 23.

The present invention uses a modified implementation of the Sigma filter, described by Jong-Sen Lee in the journal article *Digital Image Smoothing and the Sigma Filter*, Computer Vision, Graphics, and Image Processing Vol 24, p. 255–269, 1983, as a noise reduction filter to enhance the appearance of the processed digital image. The values of the pixels contained in a sampled local region, n by n pixels where n denotes the length of pixels in either the row or column direction, are compared with the value of the center pixel, or pixel of interest. Each pixel in the sampled local region is given a weighting factor of one or zero based on the absolute difference between the value of the pixel of interest and the local region pixel value. If the absolute value of the pixel value difference is less or equal to a threshold $\epsilon$, the weighting factor if set to one. Otherwise, the weighting factor is set to zero. The numerical constant $\epsilon$ is set to two times the expected noise standard deviation. Mathematically the expression for the calculation of the noise reduced pixel value is given as $$q_{mn} = \Sigma_{ij} a_{ij} p_{ij} / \Sigma_{ij} a_{ij} \tag{9}$$

and $$a_{ij}=1 \text{ if } |p_{ij}-p_{mn}|<=\epsilon$$

$$a_{ij}=0 \text{ if } |p_{ij}-p_{mn}|>\epsilon$$

where $p_{ij}$ represents the $ij^{th}$ pixel contained in the sampled local region, $p_{mn}$ represents the value of the pixel of interest located at row m and column n, $a_{ij}$ represents a weighting factor, and $q_{mn}$ represents the noise reduced pixel value. Typically, a rectangular sampling region centered about the center pixel is used with the indices i and j varied to sample the local pixel values.

The signal dependent noise feature is incorporated into the expression for $\epsilon$ given by equation (11)

$$\epsilon = Sfac\sigma_n(p_{mn}) \tag{10}$$

where $\sigma_n$ represents the noise standard deviation of the source digital image 201 evaluated at the center pixel value $p_{mn}$ as described by equations (3) and (8) above. The parameter Sfac is termed a scale factor can be used to vary the degree of noise reduction. The calculation of the noise reduced pixel value $q_{mn}$ as the division of the two sums is then calculated. The process is completed for some or all of the pixels contained in the digital image channel and for some or all the digital image channels contained in the digital image. The noise reduced pixel values constitute the noise reduced digital image. The modified implementation of the Sigma filter is an example of a noise reduction method that uses a noise characteristic table.

Referring to FIG. 3, the preferred embodiment of the present invention employs a spatial sharpening module 23 as part of the image processing method to produce an enhanced digital image 204. As such, the noise reduced digital image and the noise characteristic table 207 are received by the spatial sharpening module 23 which produces on output an enhanced digital image 204.

Although the present invention can be used any spatial sharpening filter which utilizes a priori knowledge of the noise characteristics, the preferred embodiment uses a modified implementation of the method described by Kwon et al in U.S. Pat. No. 5,081,692. This spatial sharpening method performs an un-sharp masking operation by filtering the input digital image with a spatial averaging 2-dimensional Gaussian filter (characterized by a standard deviation of 2.0 pixels) which results in a blurred digital image. The blurred digital image is subtracted from the input digital image to form a high-pass residual. In the method disclosed by Kwon et al. A local variance about a pixel of interest is calculated by using the pixel data from the high-pass residual. Based on the value of the local variance a sharpening factor is adjusted so as to amplify large signals more than small amplitude signals. The amplification factor $\phi$ is therefore a factor of the local variance v. i.e. $\phi(v)$.

The present invention modifies the method taught by Kwon et al. to make the amplification factor $\phi(v)$ a function of the estimated noise, i.e. $\phi(v,\sigma_n)$. The amplification function $\phi$ is given by a gamma function, or integral of a Gaussian probability function, as given by equation (11).

$$\phi(v) = \frac{y_o + y_{max}\Sigma e^{-(v-v_o)2/2\sigma^2}}{y_o + y_{max}\Sigma e^{-(v_{max}-v_o)2/2\sigma^2}} \tag{11}$$

where $y_O$ represents a minimum amplification factor $y_{max}$ represents a maximum amplification factor, $v_{max}$ represents a maximum abscissa value of the variable v, $v_O$ represents a transition parameter and σ represents a transition rate parameter. The variable $v_O$ is a function of the noise standard deviation value $σ_n$ in as per equation (12)

$$v_O = Sfac_2 σ_n(p_{mn}) \quad (12)$$

where the scaling factor $Sfac_2$ determines the sensitivity of the sharpening sensitivity to the noise and the noise standard deviation value an is as described above in equations (3) and (8). The optimal values for the variables used in equation (13) depend on the digital imaging application. The present invention uses a value of 1.0 for $y_O$ which results in no spatial sharpening for noisy regions. A value of 3.0 is used for $y_{max}$, however, this variable is sensitive to user preference with values ranging from 2.0 to 4.0 producing acceptable results. The value of $Sfac_2$ should be set to between 1.0 and 2.0 with 1.5 as optimal. The variable s should be set to values in the range from $v_O/2$ to $v_O/10$ for reasonable results. The variable $v_{max}$ should be set to a value much larger than the expected noise, e.g. 20 time the value of $σ_n$.

The above discussion has included details of practicing the present invention for source digital images of general type. However, most digital imaging systems accept digital images from a variety of sources. For example, the image capture device 10a and 10b shown in FIG. 1 could be a photographic film scanner while the image capture device 10c could be a digital camera or digital camcorder. The image capture device can contribute add noise to the digital images it produces, the inherent noise in the capture medium usually dominates the overall noise characteristics of the resultant digital images. For example, while a photographic film scanner can produce digital images from any photographic film sample, in general, some photographic films are inherently noisier that others. A photographic film sample is an example of a photographic image. Other examples of photographic images can include, but are not limited to, a CCD imaging electronic device and a photographic print.

In this alternative embodiment of the present invention, the image capture devices 10a, 10b, and 10c shown in FIG. 1 are capable of producing a source type identification tag 202 which uniquely identifies the source digital image 201 as belonging to a particular group. In the example given above, a photographic film sample Kodak Generation 6 Gold 200 film is scanned by the image capture device 10a which produces a source digital image 201 and a source type identification tag 202. The source type identification tag 202 identifies the source digital image 201 as being derived from Kodak Generation 6 Gold 200 film. In this alternative embodiment of the present invention a default statistical tables is used in conjunction with the pixels from the source digital image 201 to produce a noise characteristic table 207 for the source digital image 201 as described above. However, the digital imaging system, shown in FIG. 1, stores a default statistical table corresponding to each unique a source type identification tag 202. Thus the default statistical table corresponding to Kodak Generation 6 Gold 200 film is used to process the source digital image 201 derived from the scanning the Kodak Generation 6 Gold 200 film sample with the image capture device 10a. It is important to note that if a different sample of Kodak Generation 6 Gold 200 film is scanned by the image capture device 10b, the same default statistical table corresponding to Kodak Generation 6 Gold 200 film is used. Thus the default statistical table is selected on the basis of the type photographic film and not on the type of or individual unit image capture device. This feature of the present invention allows the default statistical table, and consequently the resultant calculated noise characteristic table 207, to track or relate to the type of photographic film manufactured. Since the present invention automatically updates the default statistical tables and can derive the default statistical tables from the pixel values of digital images, the present invention can be used with new types of manufactured photographic film without the need of a disseminated data base of either statistical tables or noise characteristic tables.

Those skilled in the art will recognized that this feature of the present invention can easily be extended to include other sources of digital images. For example, the image capture device 10c can be a digital still camera, such as the Kodak DCS 290. For this example, the image capture device 10c produces a unique source type identification tag 202. In this manner any newly produced digital camera which produces a new and unique source type identification tag 202 can be processed effectively with the present invention. When the digital imaging systems shown in FIG. 1 encounters a previously unknown source type identification tag 202, a new default statistical table is created.

In another alternative embodiment of the present invention the digital imaging system shown in FIG. 1 maintains a separate database of default statistical tables, one for each source identification tag, for each image capture device 10a and 10b. Since the image capture device can contribute some noise to the digital images it produces, maintaining separate databases of default statistical tables for each image capture device results in more accurate noise characteristic tables.

While the preferred embodiment of the present invention calculates a noise characteristic table and then subsequently uses the noise characteristic table to produce an enhanced digital image 204, some digital imaging systems may choose to separate the calculation phase from the enhancement phase. In an alternative embodiment of the present invention, the calculated noise characteristic table 207 is stored with the source digital image 201 as meta-data, i.e. non-pixel information. The source digital image 201 with meta-data can be transmitted to a remote site or stored for safe keeping to be used at a later time or another site. Any of the above mentioned noise characteristic tables (the local noise characteristic table, the default characteristic table or the updated characteristic table) can be stored as meta-data. In general a noise characteristic table requires much less memory storage than a set of residual histograms. In a still further alternative embodiment of the present invention a set of residual histograms is stored with the source digital image 201 as meta-data.

The invention has been described in detail with particular reference to certain preferred embodiments thereof, but it will be understood that variations and modifications can be effected within the spirit and scope of the invention.

What is claimed is:

1. A method of estimating noise in a digital image comprising:
   accumulating statistical noise data in a plurality of default statistical tables, wherein each default statistical table corresponds to a unique source identification tag associated with a particular film type, and wherein the statistical noise data within a given default statistical table is related to a particular film type;
   utilizing image pixel data from a digital image to calculate a statistical noise data table corresponding to the digital image;

utilizing a source identification tag corresponding to the digital image to select a default statistical table from the plurality of default statistical tables; and utilizing the selected default statistical table in conjunction with the statistical noise data table corresponding to the digital image to generate a resultant calculated noise characteristic table.

2. The method of claim 1, wherein the default statistical tables, the statistical noise data table and the resultant calculated noise characteristic table each includes a series of standard deviation values for different ranges of scanner intensities.

3. The method claimed in claim 2, wherein the resultant calculated noise characteristic table is used in processing the digital image to generate an enhanced digital image.

4. The method claimed in claim 3, wherein a spatial filter is used to calculate the enhanced digital image.

5. The method claimed in claim 3, further including the step of using the resultant calculated noise characteristic table and a noise reduction filter to calculate the enhanced digital image.

6. The method claimed in claim 3, further including the step of using the resultant calculated noise characteristic table and a spatial sharpening filter to calculate the enhanced digital image.

7. The method claimed in claim 3, further including the step of using the resultant calculated noise characteristic table, a noise reduction filter and a spatial sharpening filter to calculate the enhanced digital image.

8. The method of claim 1, wherein default statistical tables, the statistical noise data table and the resultant calculated noise characteristic table each includes at least one histogram.

9. The method of claim 1, wherein default statistical tables, the statistical noise data table and the resultant calculated noise characteristic table each includes a series of histograms for different ranges of scanner intensities.

10. A method as claimed in claim 1, wherein the digital image is generated by a scanning device capable of scanning a film and generating image pixel data corresponding to the digital image and a source identification tag corresponding to the digital image.

* * * * *